July 10, 1962

L. R. SANDALL 3,043,081

END SHOE FOR A CUTTER BAR

Filed Nov. 25, 1960

INVENTOR.
LLOYD R. SANDALL,
BY
McMorrow, Berman + Davidson
ATTORNEYS.

3,043,081
END SHOE FOR A CUTTER BAR
Lloyd R. Sandall, Bassett, Nebr.
Filed Nov. 25, 1960, Ser. No. 71,702
6 Claims. (Cl. 56—314)

This invention relates to a mowing or reaping machine for attachment to a tractor or other automotive vehicle and, more specifically, the instant invention pertains to an improved end shoe for the outer end of the cutter bar of a mowing machine.

It has been found that conventional end shoes for mowing or reaping machines usually include an opening through which the outer end of the reciprocating cutter blade moves. These are, in all known instances, closed openings, that is, the openings have a continuous peripheral wall. As such, cut material, such as grass, weeds, or cut grain, depending upon the operation being carried on by the machine, tend to clog this opening, thereby interfering with the reciprocating action of the cutter blade of the mowing machine. Thus, it is one of the primary objects of this invention to provide a shoe for the outer end of a mowing or reaping machine which will not clog and is, in effect, self-cleaning.

A further object of this invention is to provide an improved divider plate in the outer shoe of the mowing or reaping machine together with divider rods extending from the shoe and being adjustably mounted thereon.

This invention contemplates, as a still further object thereof, the provision of a mowing or reaping machine having an improved outer shoe, the shoe being non-complex in construction and assembly, inexpensive, relatively speaking, to manufacture and maintain, and a shoe which is rugged and durable in use.

Other and further objects and advantages of the instant invention will become more evident from a consideration of the following specification when read in conjunction with the annexed drawing, in which.

Figure 1:
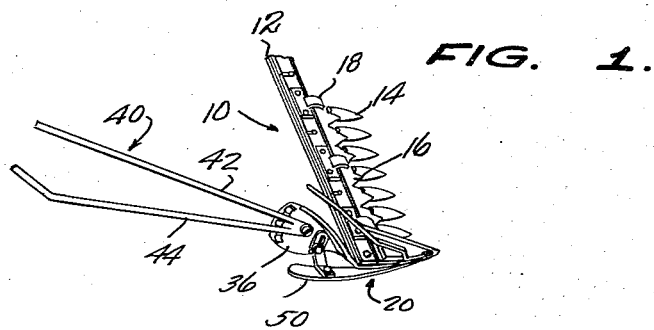
FIGURE 1 is a fragmentary perspective view of a mowing or reaping machine illustrating an improved shoe connected to the outer end thereof and constructed in accordance with this invention.
Figure 2:
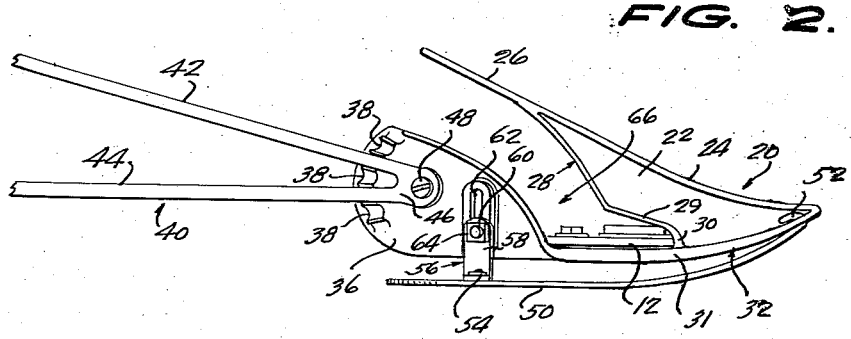
FIGURE 2 is an enlarged side elevational view of the improved shoe shown in FIGURE 1.
Figure 3:
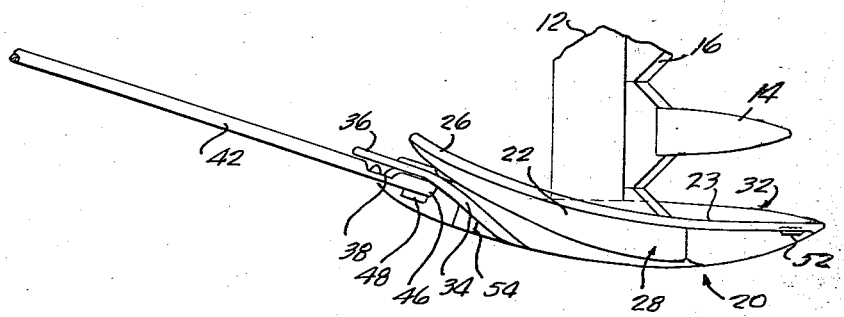
FIGURE 3 is a top plan view of the improved shoe as shown in FIGURES 1 and 2.

Referring now more specifically to the drawing, reference numeral 10 designates, in general, a mowing or reaping machine constructed in accordance with this invention. The mowing machine 10 includes a conventional sickle bar 12, the inner end of which (not shown) is connected through conventional means with a tractor or other source of motive power. Connected to the sickle bar 12 are the usual guide members 14 and a reciprocable cutter bar 16, the latter being driven through known means. Reference numeral 18 denotes the conventional arcuately-shaped hold-down elements for the cutter bar. The construction thus far described is conventional in the art as exemplified by the United States grant of Letters Patent to Arthur H. Valentine, No. 2,687,000, issued on August 24, 1954.

Connected to the outer end of the mowing or reaping device is a ground-engaging shoe referred to in the drawing, in general, by reference numeral 20, and it is to this shoe that the instant invention is directed.

The shoe 20 is seen to comprise a normally vertically-extending divider plate 22 having a concave-convex configuration with the concave side 23 facing inwardly toward the sickle bar 12. The upper end of the plate is smoothed or rounded, as at 24, and is integral at its trailing end with an extension 26. Substantially at the junction of the plate 22 with its extension 26, the plate 22 is provided with a downwardly-extending arcuate flange 28 which projects from the plate 22 in a direction away from the sickle bar 12. As is seen in the drawing, the concave side of the flange 28 faces generally downwardly. The flange 28 includes an extension 29 inwardly off-set with respect to the main body portion of the plate 22, and the extension 29 terminates at its inner end in a downwardly-extending portion 30 integrally connected with the upper side of the cutter bar seat 31. The latter is also integral with the plate 22 and extends on both sides thereof.

The cutter bar seat 31 has a leading end portion, designated, in general, at 32, which is essentially ogive in configuration, and the seat 31, intermediate its ends, is formed with a one-quarter turn at 34 and terminates at its trailing end in a normally vertical segment-shaped plate 36. Integral with the plate 36 and adjacent the periphery thereof are integrally-formed, laterally-projecting, arcuately-spaced lugs 38.

Reference numeral 40 denotes, in general, dividing means having a V-shaped configuration and including arms 42, 44 which join at the apex 46. The apex 46 is pivotally secured to the plate 36 by a bolt 48 with the arms 42, 44 spanning and being interlocked by one of the lugs 38. As is clearly seen in the figures of the drawing, the arms 42, 44, at a point behind the plate 36, are inwardly-bent toward the sickle bar 12.

Reference numeral 50 designates a flat sole for the shoe 20 the sole being substantially ovate in configuration and terminates at its narrowest end in an upwardly-projecting hook 52 loosely received in a suitable aperture formed in the leading end of the cutter bar seat 31. The connection is such as to provide pivotal movement between the sole 50 and the cutter bar seat 31.

The sole 50, adjacent its other or trailing end, is fixedly secured to the foot portion 54 of an angle member 56 having a leg portion 58, the leg portion 58 carrying a bolt 60 which extends transversely through an upright slot 62 formed in the plate 36 intermediate the ends of the latter. The desired adjustment of the sole 50 relative to the bar seat 31 is maintained by means of a nut 64 threaded on the bolt 60 to effect the clamping of the leg portion 58 against the adjacent side of the plate 36.

The sickle bar 12 is fixedly secured to the bar seat 31 by conventional means (not shown), and it should be noted that the construction of the shoe 20 is such as to leave an open throat 66 between the cutter bar seat 31 and adjacent portions of the divider plate 22 and its extension 26. Through the provision of this open throat 66 it is impossible for mowed materials to accumulate adjacent the outer end of the sickle bar 12 to such an extent as to interfere with the action of the cutter bar 16. As a matter-of-fact, the provision of the open throat 66 which communicates with the outer end of the sickle bar 12 and the adjacent end of the cutter bar 16 provides means whereby the throat 66 is self-cleaning, and the build up or accumulation of mowed materials in the throat 66 is substantially eliminated.

The curvature of the shoe divider plate 22 and the angularity of the divider arms 42, 44 insure that the mowed or reaped material will be divided away from the immediately adjacent remaining stand of grass or grain whereby the tractor drawn mowing or reaping device 10 may be turned to traverse the next swatch. The angularity of the arms 42, 44, in a vertical direction, is controlled through the pivotal connection 48, and the arms 42, 44 are locked in their respective adjusted positions by one of the lugs 38 which is interlocked therebetween. The height of the cut is adjusted by pivoting the sole 50 about its sub-connection 52 and securing the same at its trailing end by the bolt 60 and nut 64.

Having described and illustrated one embodiment of this invention in detail, it will be understood that the same is offered merely by way of example, and that this invention is to be limited only by the scope of the appended claims.

What is claimed is:

1. An end shoe for the cutter bar of a mowing machine comprising a normally vertical divider plate, said divider plate having an upper end extension and a first flange projecting laterally from an end thereof, said flange extending downwardly from the junction of said plate with its said extension, a cutter bar seat to fixedly receive the outer end of the mowing machine cutter bar, said seat comprising a second flange fixedly secured to said plate at the lower end thereof and projecting laterally beyond the opposed sides thereof, said second flange having a leading end of substantially ogive configuration, said second flange being fixedly secured to said first flange at the lower end of said first flange and said second flange having an intermediate portion downwardly spaced from said plate to receive said cutter bar therein, said second flange having a normally vertical trailing end plate integral therewith, and a substantially flat ground-engaging shoe sole connected to said divider plate and to said trailing end plate.

2. An end shoe for the cutter bar of a mowing machine comprising a normally vertical divider plate having a vertically-extending concave-convex configuration and an upper end extension, a first flange projecting laterally from a side of said plate, said flange extending downwardly from the junction of said plate with its said extension, a cutter bar seat to fixedly receive an end of a mowing machine cutter bar, said concave side of said plate facing in the direction of said cutter bar, said seat comprising a second flange fixedly secured to said plate at the lower end thereof and projecting laterally beyond the opposed side thereof, said second flange having a leading end of substantially ogive configuration, said second flange being fixedly secured to said first flange at the lower end thereof and said second flange having an intermediate portion downwardly spaced from said plate to receive said cutter bar therein, said second flange having a normally vertical trailing end plate, and a substantially flat ground-engaging shoe sole connected to said divider plate and to said end plate.

3. A mowing or reaping machine including an elongated sickle bar having a cutter bar mounted for reciprocation thereon and a plurality of guard members therefor, said mowing or reaping machine also including an end shoe for connection with one end of said sickle bar, said shoe comprising a normally vertical divider plate having a concave-convex configuration with the concave side thereof facing inwardly toward said sickle bar, an arcuately-shaped first flange fixedly connected to one end of said plate with the concave side thereof facing downwardly, said first flange projecting laterally away from one side of said divider plate, a sickle bar seat for connection with said one end of said sickle bar, said seat comprising a second flange fixedly secured to said divider plate and to said first flange at the lower end thereof, said second flange having portions thereof disposed in vertically-spaced relation relative to said first flange to receive said one end of said sickle bar therein, said second flange intermediate its ends having a trailing end plate substantially perpendicular to said second flange, said trailing end plate having a segmental configuration, and a ground-engaging shoe sole connected at one of its ends with said divider plate and at its other end with said trailing end plate.

4. A mowing or reaping machine including an elongated sickle bar having a cutter bar mounted for reciprocation thereon and a plurality of guard members therefor, said mowing or reaping machine also including an end shoe for connection with one end of said sickle bar, said shoe comprising a normally vertical divider plate having a concave-convex configuration with the concave side thereof facing inwardly toward said sickle bar, an arcuately-shaped first flange fixedly secured to one end of said plate with the concave side thereof facing downwardly, said first flange projecting laterally away from one side of said divider plate, a sickle bar seat for connection with said one end of said sickle bar, said seat comprising a second flange fixedly secured to said divider plate and to said first flange at the lower end thereof, said second flange having portions thereof disposed in vertically-spaced relation relative to said first flange to receive said one end of said sickle bar therein, said second flange intermediate its ends having a trailing end plate substantially perpendicular to said second flange, said trailing end plate having a segmental configuration, a plurality of divider arms pivotally connected to said trailing end plate for vertical adjustment relative thereto, and a ground-engaging shoe sole connected at one of its ends with said divider plate and at its other end with said trailing end plate.

5. A mowing or reaping machine including an elongated substantially rectangular sickle bar projecting laterally therefrom and having a cutter bar mounted for reciprocation thereon and a plurality of guard members therefor, said mowing and reaping machine also including an outer end shoe for connection with the outer end of said sickle bar, said shoe comprising a normally vertical divider plate having a concave-convex configuration with the concave side thereof facing inwardly toward said sickle bar, an arcuately-shaped first flange fixedly secured to one side of said plate with the concave side thereof facing downwardly, said first flange projecting laterally away from one side of said divider plate, a sickle bar seat for connection with said outer end of said sickle bar, said seat comprising a second flange fixedly secured to said divider plate and to said first flange at the lower end therof, said second flange having portions thereof disposed in vertically-spaced relation relative to said first flange to receive said one end of said sickle bar therein and to provide a rearwardly-opening open throat, said second flange rising rearwardly away from said throat and having an integrally-formed trailing end plate depending therefrom substantially perpendicular to said second flange, said trailing end plate having a substantially segmental configuration, a V-shaped divider member including a pair of arms converging toward the apex thereof, means pivotally connecting said apex to said trailing end plate, a plurality of abutment lugs formed on said trailing end plate and disposed in arcuately-spaced relation, said arms spanning at least one of said lugs, and a ground-engaging shoe sole connected at one of its ends with said divider plate and at its other end with said trailing end plate.

6. A mowing or reaping machine end shoe as defined in claim 5, wherein said sole has a substantially ovate configuration and includes a pivotal hook connection with said divider plate, and adjustable means connecting the trailing end of said sole with said trailing end of said plate.

References Cited in the file of this patent

UNITED STATES PATENTS

| | | |
|---|---|---|
| 1,490,151 | Wheaton | Apr. 15, 1924 |
| 2,872,771 | Bentz | Feb. 10, 1959 |
| 2,910,820 | Harvey et al. | Nov. 3, 1959 |
| 2,963,845 | Matile | Dec. 13, 1960 |